United States Patent [19]

Mizzi

[11] 4,291,315

[45] Sep. 22, 1981

[54] APPARATUS FOR PROVIDING A CONSTANT DENSITY TRACE OF ECG ANALOG SIGNALS

[75] Inventor: John V. Mizzi, Goldens Bridge, N.Y.

[73] Assignee: International Business Machines Corporation, Armonk, N.Y.

[21] Appl. No.: 108,112

[22] Filed: Dec. 28, 1979

[51] Int. Cl.³ .................................................. G01D 15/10
[52] U.S. Cl. .................................. 346/76 R; 219/216
[58] Field of Search .................. 346/76 R, 33 ME; 219/216

[56] References Cited

U.S. PATENT DOCUMENTS

| | | | |
|---|---|---|---|
| 2,454,966 | 11/1948 | Faus | 346/112 |
| 2,644,738 | 7/1953 | Gardner | 346/76 |
| 3,002,802 | 10/1961 | Rich | 346/76 |
| 3,735,417 | 5/1973 | Holzhauser | 346/139 C |
| 3,813,677 | 5/1974 | Shimotsuma | 346/76 R |
| 3,908,641 | 9/1975 | Judson et al. | 128/2.06 G |
| 4,092,649 | 5/1978 | Miller | 346/76 R |
| 4,139,854 | 2/1979 | Walker | 346/76 R |

Primary Examiner—L. T. Hix
Assistant Examiner—W. J. Brady
Attorney, Agent, or Firm—Thomas J. Kilgannon, Jr.

[57] ABSTRACT

Apparatus for providing a constant density trace of an analog signal which utilizes a thermal stylus is disclosed. The minimum rise and fall times of the analog signal are of the same order of magnitude as the thermal time constant of the thermal stylus. The thermal stylus is typically controlled by a galvanometer type movement which is responsive to the variations in an analog signal. In a preferred approach, the analog signals are those obtained from electrodes connected to a human body. The thermal stylus contains a heat generating element which, in the usual situations, heats up in response to a fixed heating voltage. In the present situation, the heating element is responsive to the absolute value of the rate of change of amplitude of the analog signal. Because it is desired to provide a constant density trace in an environment where the signal rise and fall times are marginally longer than the thermal time constant of the thermal stylus, the high rate of change of signal must be anticipated to ensure that the stylus is already at the desired temperature when the analog signal from the stylus driver deflects the stylus in the usual manner. This is achieved by providing means for introducing a delay which is a direct function of the thermal time constant of the thermal stylus into the deflection circuit. In this manner, then, the stylus is pre-heated to a desired temperature and gaps in the trace or over dark portions of the trace are avoided.

9 Claims, 3 Drawing Figures

APPARATUS FOR PROVIDING A CONSTANT DENSITY TRACE OF ECG ANALOG SIGNALS

DESCRIPTION

1. Technical Field

This invention relates to strip chart recorders and more particularly relates to apparatus for providing a constant density trace of an analog signal. Still more particularly it relates to strip chart recorders which utilize a thermal stylus, the thermal time constant of which is of the same order of magnitude as the minimum rise and fall times of the analog signal. The apparatus is adapted to operate in both analog and digital modes.

2. Background Art

The problem of achieving a constant density trace of analog signals wherein the latter have high rates of change of amplitude has been broadly and extensively addressed by the prior art. To achieve an appreciation of the boundary conditions which affected both the prior art and the present application, it should be understood that where the time constant of the thermal stylus or tip is short with respect to the rise and fall times of the analog signal, there is only a marginal problem in that the thermal stylus or tip reaches its operating temperature almost as soon as the signal begins to rise or fall and only a small portion of the trace is of low density. Under such circumstances, there is no requirement for anticipating the application of heat to the stylus. An example of such an arrangement is shown in U.S. Pat. No. 2,644,738, filed Mar. 22, 1951. In this patent, the analog signal is applied to a galvanometer and the current which heats the stylus is under control of a rectified and amplified version of the same analog signal. In another approach shown in U.S. Pat. No. 2,454,966, filed Feb. 14, 1947, both a stylus and a chart paper are heated so that a surface coating on the paper is scraped off to reveal a darker base paper. The temperature to which the paper is heated is a function of the age and amount of softening material used in the lacquer covered paper, the weight of the paper used, its rate of travel and the temperature and speed of travel of the stylus. In this reference, neither the temperature of the platen nor the stylus is varied during operation.

U.S. Pat. No. 3,002,802, filed Jan. 21, 1959 shows a circuit arrangement wherein the stylus heater resistance carries the emitter currents for a pair of push-pull D. C. amplifiers. In this arrangement, the amount of heat generated by the stylus heater is proportional to the square of the operating current. The stylus resistance performs a dual function of providing a high equalizing resistance for the push-pull connected transistors and heat for the operation of the stylus. In this reference, the variation in heating power to the stylus appears to follow the variation in amplitude of the analog signal directly.

In still another arrangement shown in U.S. Pat. No. 3,735,417, filed May 22, 1973, a thermistor having a positive temperature coefficient of resistant is used to counteract variations in heat dissipation from the surface of the thermistor during movement of the stylus across a recording medium. The changes in heat dissipation arise from changes in speed of the stylus, variations in voltage of the power supply energizing thermistor, etc. The thermistor is mounted on a carrier and is operated at a high temperature to provide a trace on a sensitive recording medium. In this reference, the thermal stylus temperature is essentially self regulating.

In U.S. Pat. No. 3,908,641, filed June 7, 1974, an electrocardiograph unit employs a marker stylus and a writing stylus for recording signals on heat sensitive paper. In this patent, a run switch is operated to bring the heat sensitive paper from a stopped position to a selected speed. The operation of the run switch also causes heat to be applied in an initial surge of heating current in excess of a predetermined level. Thereafter, the heating current is automatically reduced to a predetermined level and remains there. In this arrangement, the stylus is heated under operator control by a run switch prior to applying the signal which is to be recorded.

U.S. Pat. No. 4,092,649 filed Mar. 30, 1977, provides pulses from a pulse generator the frequency of which is a function of the velocity of a motor which drives a heated stylus. As a result, an associated circuit produces proportionately more stylus heater energization as the stylus velocity increases and vice versa. In this way, the heater power is a function of the stylus velocity which in turn makes the recorded trace intensity independent of velocity. In this reference, the heater is energized as a direct function of the applied analog signal.

U.S. Pat. No. 3,813,677, filed Feb. 20, 1973, similarly provides pulses to a thermal head. The pulses applied to the thermal head are a function of both the paper speed drive and the position of a motor which is driven in response to the amplitude of an applied analog signal. The pulse generator provides an output at controlled average pulse frequencies which results in a substantially constant density trace.

U.S. Pat. No. 4,139,854, filed Nov. 21, 1977, shows a resistive stylus in a thermographic strip chart recorder which is connected by way of an adjustable selector switch to taps of an auxilliary secondary winding added to a D.C. inverter customarily used to power the recorder pen motor. The amount of current to the stylus and thus the stylus temperature may be varied in accordance with the recorder chart speed by adjusting the selector switch that connected the desired number of secondary winding turns to the stylus. Here there is no indication that a constant density trace is of concern when the signal is being applied.

From all the foregoing, it should be clear that while the general problem of providing uniform line density when recording analog signals with thermal stylii has been addressed, the specific problem of providing constant line densities of an analog signal wherein the minimum rise and fall times of the analog signal to be recorded are of the same order of magnitude as the thermal time constant of the thermal stylus has not been addressed. In the prior art, the thermal time constant is either short relative to the rise and fall times of the analog signal or heating is applied to the stylus prior to signal tracing under manual control.

It is, therefore, a principal object of this invention to provide apparatus which provides a constant density trace of an analog signal wherein the minimum rise and fall times of the analog signal are of the same order of magnitude as the thermal time constant of an associated thermal stylus.

It is another object of the present invention to provide apparatus which generates a constant density trace which includes a delay of at most the thermal time constant of an associated thermal stylus.

It is another object of the present invention to provide a constant density trace of an analog signal using a thermal stylus wherein the temperature of the thermal stylus is a function of the magnitude of the rate of change of amplitude of the applied analog signal.

Still another object is to provide apparatus which generates a constant density trace of an analog signal which operates in both the digital and analog modes.

Yet another object of the present invention is to provide a constant density trace of an analog signal wherein the analog signal is of the type which provides an electrocardiograph (ECG).

BRIEF SUMMARY OF THE INVENTION

The present invention relates to strip chart recorders which utilize a thermal stylus. Because of speed variations as the heated stylus moves in response to an ECG signal and particularly where the rise and fall times of the analog signal being recorded are of the same order of magnitude as the thermal time constant of the associated thermal stylus, the density of the line recorded on the chart paper is not uniform or constant. The present application provides constant or uniform density plots in such circumstances by modulating the stylus temperature of the strip chart recorder. The modulation for a thermal stylus is obtained by differentiating the input signal in a differentiating circuit; rectifying the differentiated output to obtain the absolute magnitudes of the rate of change of the input signal; amplifying these signals to a desired level and applying these amplified signals via a driver to the thermal stylus. The thermal stylus which is connected to a stylus deflection driver is deflected in a known way after introducing a delay which is a direct function of the thermal time constant of the thermal stylus. In this way, the thermal stylus is at a desired temperature which is a function of the rate of change of an amplitude of the applied analog signal just as the stylus is deflected by the application of the analog signal to the stylus deflection circuitry. Thus, the faster the input signal changes, the greater will be the power input to the stylus and, after at most a thermal time constant delay, the stylus will have sufficient heat to provide a trace which does not fade during high rate of change deflections of the stylus tip. In addition to the foregoing analog version, the present invention is embodied in a digital version.

In the digital mode, the output of a buffer which contains information relating to the rate of change of the ECG signal in digital form, drives a programmable gain amplifier in such a way that the thermal stylus is heated prior to deflection of the thermal stylus by a delayed analog signal which was converted from digital to analog form.

These and other objects, features and advantages will be more apparent from the following more particular description of the preferred embodiments.

BRIEF DESCRIPTION OF THE DRAWINGS

In FIG. 1, the thermal stylus is heated by applying current thereto which is a function of the absolute value of the rate of change of amplitude of an input analog signal.

DESCRIPTION OF PREFERRED EMBODIMENTS

Figure 1:
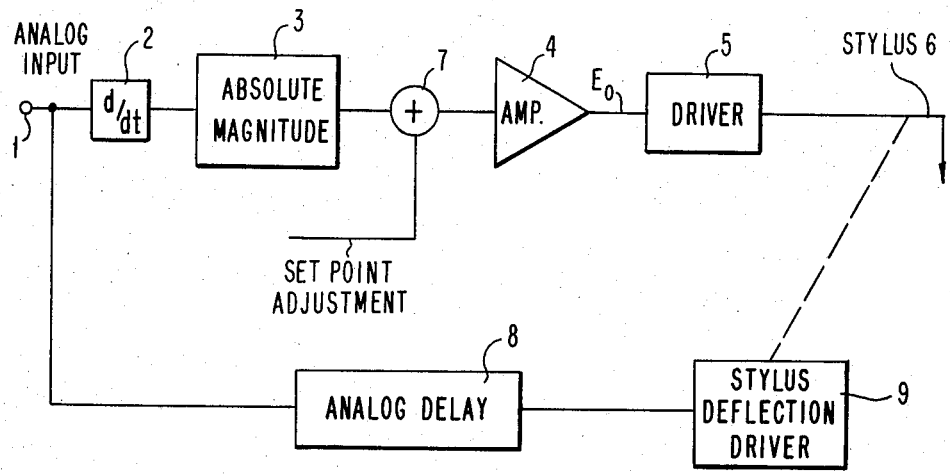
FIG. 1 is a block diagram of apparatus for providing a constant density trace of an analog signal wherein the minimum rise and fall times of the analog signal are of the same order of magnitude as the thermal time constant of an associated thermal stylus.

Referring now to FIG. 1, there is shown therein a block diagram of circuitry which deflects and heats the stylus of a thermal strip chart recorder. The stylus has a thermal time constant which of the same order of magnitude as the rise and fall times of the applied analog signal. For purposes of the present invention, the thermal time constant (Tc) is defined as the time required for a thermal stylus to achieve 0.632 of an equilibrium temperature with a constant power input. If the stylus has a time constant which is short relative to the rise and fall times of the analog signal so that the stylus is generally at the correct temperature as the applied analog signal moves the stylus, the worst that can be expected is that a small portion of the trace is of low density and another small portion is of extra high density. However, if the stylus can't heat up immediately and deflection starts before the stylus is at the required temperature, a relatively large portion of the trace is of low density. This situation arises where the time constant of the thermal stylus is only marginally shorter than the signal rise and fall times. Under such circumstances, the deflection of the stylus is practically completed by the time the stylus heats up sufficiently to provide a trace portion of the desired density. To eliminate these low and high density trace portions, the analog signal which deflects the stylus is delayed by an amount equal to at most the thermal time constant of the stylus while the absolute value of the rate of change of amplitude of the analog signal with respect to time is applied to the stylus in anticipation of a high rate of deflection of said stylus.

Figure 2:
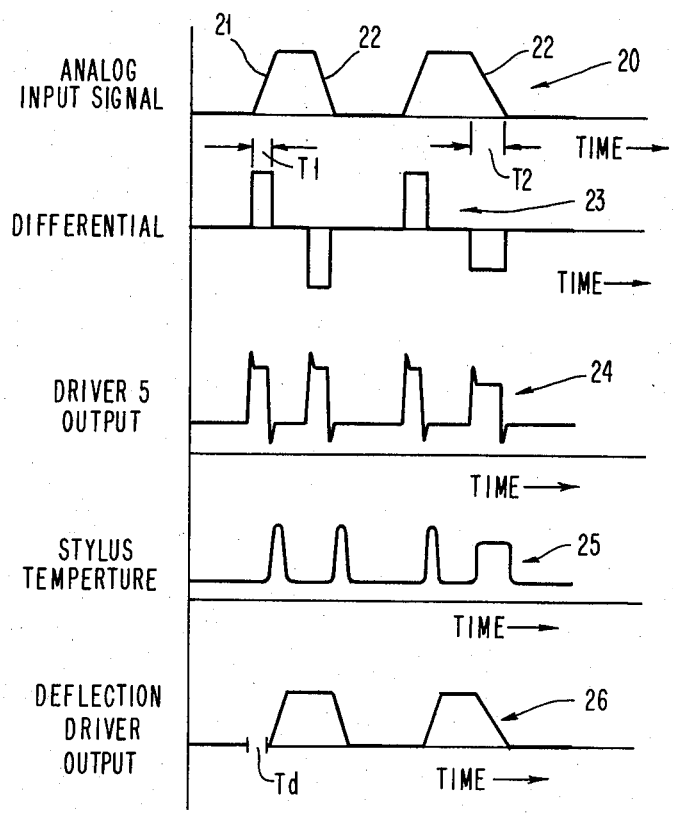
FIG. 2 shows waveforms applied at and obtained from various elements of the block diagram of FIG. 1. These waveforms include an analog input waveform, the differential of the input waveform; the absolute value of the differential; the stylus temperature waveform and the delayed stylus deflection waveform.

Referring now to FIG. 1 in more detail, an analog input signal which may be due to the variation of any physical parameter with time is applied to input terminal 1. The analog input signal may be an ECG signal derived in a well-known way by means of electrodes attached to the body of a patient. However, for purposes of explanation, a generalized analog waveform 20 is shown in FIG. 2 along with other waveforms which will be discussed in conjunction with the explanation of the block diagram of FIG. 1. Analog waveform 20 has leading and trailing edges 21, 22 respectively, with rather large slopes which would require any recording of such leading and trailing edges to be carried out in extremely short time intervals. Thus, leading edge 21 of the leftmost portion of waveform 20 would have to be recorded in an interval T1 while trailing edge 21 of the rightmost portion of waveform 20 would have to be recorded in an interval T2 as shown in FIG. 2. When the thermal time constant of a thermal stylus is approximately of the same magnitude as T1, T2, it should be clear that a trace of leading and trailing edges 21, 22 would be terminated before the thermal stylus is heated sufficiently to provide a constant density trace. The stylus would also remain hot too long causing an overly dense trace (i.e. blooming) to the right of any high speed excursion of waveform 20.

After an analog signal represented by a waveform 20 is applied to input terminal 1, waveform 20 is applied to a differentiating circuit represented by block 2 in FIG. 1 and otherwise identified therein by the designation d/dt. Block 2 may be any differentiating circuit well-known to those skilled in the electronics art and is commercially available. Waveform 23 in FIG. 2 shows the differentiated form of waveform 20. Waveform 23 of FIG. 2 is then applied to block 3 of FIG. 1 which is otherwise identified in FIG. 1 by the caption Absolute Magnitude. Block 3 may be any full wave rectifier well known to those skilled in the electronics art which is commercially available and which provides at its output a rectified version of waveform 23 of FIG. 2. Waveform 24 in FIG. 2 shows the rectified version with overshoot of waveform 23. The latter is then applied to block 4 which is otherwise identified in FIG. 1 by the caption Amp. The output of block 4 has a waveform similar to waveform 24 of FIG. 2 except that its amplitude is adjusted to a desired value.

Block 4 of FIG. 1 should be a so-called Square Law amplifier with overshoot having an output:

$$E_o = KE^2{in} + \text{bi-directional overshoot}$$

where Ein is the input to the amplifier represented by block 4 of FIG. 1. The positive and negative overshoots shown in waveform 24 of FIG. 2 act to enhance the thermal response of stylus 6 so that heating and cooling transitions occur more quickly than they would if the overshoots were not provided. The effect, while useful, is a secondary effect and is useful in practical situations. The output Eo is applied to block 5 of FIG. 1 which represents a stylus heat driver and is otherwise identified in FIG. 1 by the caption Driver. The Driver is conventional and well-known to those skilled in the electronics art. The current provided by the stylus driver has a waveform similar to waveform 24 and is applied to thermal stylus 6 shown connected to driver 5 in FIG. 1. The application of voltage to thermal stylus 6 causes the temperature of stylus 6 to change with time in a manner shown by waveform 25 in FIG. 2. A set point adjustment circuit 7 provides a bias to the arrangement of FIG. 1 so that thermal stylus 6 is at a temperature which will provide a trace for analog input signals of zero slope.

Simultaneously with the application of analog input signal to the differentiating circuit represented by block 2 in FIG. 1, the same analog input signal is applied to an analog delay element represented by block 8 in FIG. 1 and otherwise identified therein by the caption Analog Delay. The analog delay element represented by block 8 in FIG. 1 may be any arrangement well-known to those skilled in the electronics art which is capable of providing a desired delay. In the arrangement of FIG. 1, the amount of delay introduced (Td) is a direct function of the thermal time constant Tc of stylus 6. The output of the analog delay element is applied to a stylus deflection driver represented by block 9 in FIG. 1 and otherwise identified therein by the caption Stylus Deflection Driver. The Stylus Deflection Driver may be any well-known arrangement which drives a galvanometer arrangement in a well-known way so that thermal stylus 6 is deflected across a chart of a strip chart recorder. The delayed deflection driver input waveform 26 having a delay Td is shown in FIG. 2. Waveform 26 has substantially the same shape as waveform 20 except that it is amplified and delayed so that the desired deflection of thermal stylus 6 takes place only after the output of the stylus deflection driver has been delayed by Td which is a function of the thermal time constant of stylus 6. In this way, the temperature of thermal stylus 6 which is a function of the absolute value of the rate of change of the analog signal with respect to time is already at a level which will provide a constant density trace when deflection driver waveform 26 deflects stylus 6.

From the foregoing, it should be clear that standard strip chart recorders can be modified in a simple and direct way to overcome the problem of changing density of an analog trace using a thermal stylus. Thus, for thermal stylii having thermal time constants in a range of 3–20 milliseconds, an analog bucket brigade delay line which provide delays in a range of 0.5 to 50 ms, such as the Signetics NE502 may be utilized. In practical situations, depending on the thermal time constant and other physical parameters such as heat transfer between the stylus and thermally responsive chart paper, the actual delay introduced may be as little as 10 percent of the thermal time constant of the stylus.

Square Law amplifier represented by block 4 in FIG. 1 is commercially available and one like Analog Devices model 433J/B which is a modular multifunction circuit may be utilized in the practice of the present invention. Thermal stylus 6 and all the other elements of FIG. 1 are so standard in the strip chart recorder art that no further description of their function or commercial availability is required.

Figure 3:
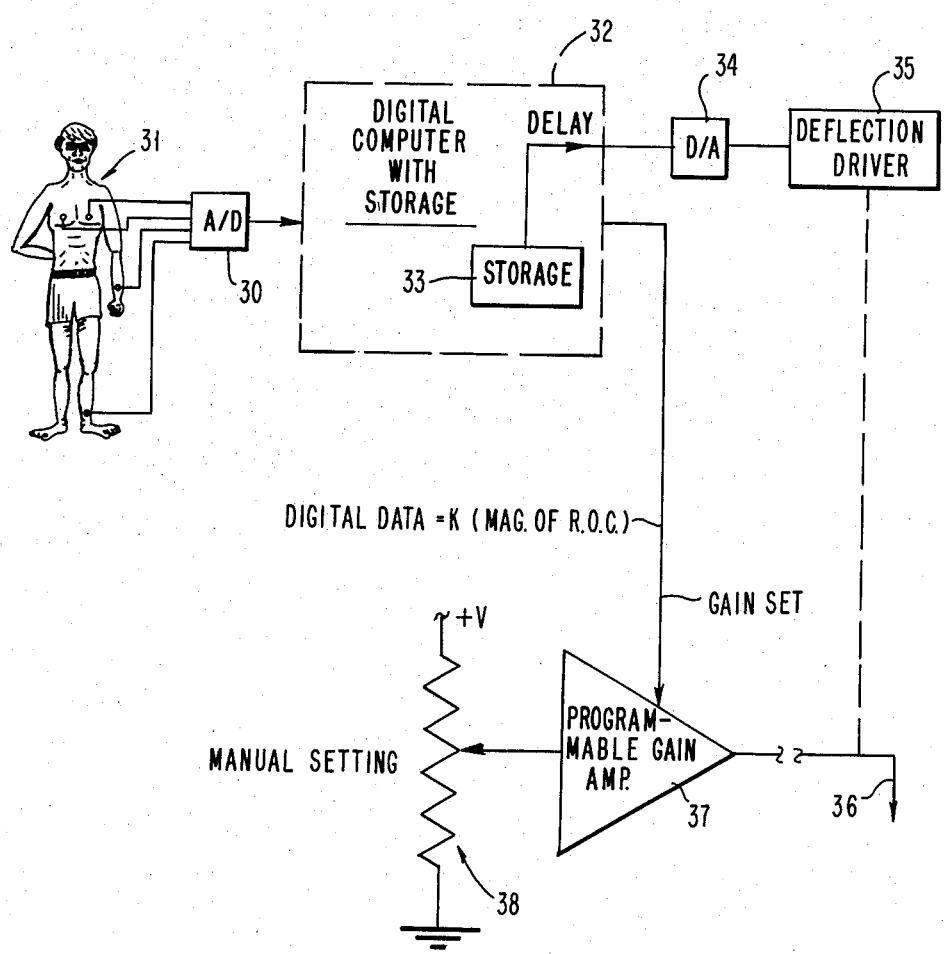
FIG. 3 is a partial schematic, partial block diagram of apparatus for providing a constant density trace of an ECG analog signal wherein the rise and fall times of the analog signal are of the same order of magnitude as the thermal time constant of an associated thermal stylus. In this arrangement, the analog ECG signals are converted to digital data and applied to a storage area of a digital computer. When an output plot is required, a digital signal relating to the rate of change of the stored digital data is used to control the gain of a programmable gain amplifier. The output of the latter is then applied to a thermal stylus via a thermal heat driver. After introducing an appropriate delay, a stream of digital data is outputted to a digital-to-analog converter. The output of the latter drives a stylus deflection driver in the usual way.

Referring now to FIG. 3 there is shown a partial schematic, partial block diagram apparatus for providing a constant density trace of an ECG analog signal wherein the rise and fall times of the analog signal are of the same order of magnitude as the thermal time constant of an associated thermal stylus. In the arrangement of FIG. 3, the analog ECG signals are converted to digital data and applied to a storage area of a digital computer. When a strip chart recording is required, data derived from the stored digital data is applied to a programmable gain amplifier; the output of which is applied to a thermal stylus via a thermal heat driver. After introducing an appropriate delay, a stream of digital data representing the applied analog signal is outputted to a digital-to-analog converter. The output of the latter drives a stylus deflection driver in the usual way.

Referring now to FIG. 3 in more detail, an analog-to-digital converter represented by block 30 and otherwise identified in FIG. 3 by the caption A/D converts analog ECG signals obtained from a patient 31 in a well-known way to digital signals. The digital information is applied to block 32 which represents a Digital Computer With Storage and is otherwise identified by that caption in FIG. 3. Block 32 includes a block 33 which represents a storage area of the digital computer. Block 33 is otherwise identified in FIG. 3 by the caption Storage. Block 33 may be a random access memory, a magnetic diskette or any other storage arrangement normally used in the digital environment. Block 33 then stores ECG data in digital form and this may be accessed under program control for analysis, display or for the generation of an ECG strip chart. When the latter function is to be carried out, a stream of digital data is applied, under program control, to block 34 which represents a digital-to-analog converter. Block 34 is otherwise identified in FIG. 3 by the caption D/A. The stream of digital data is applied to block 34 after a delay which is at most the thermal time constant of the stylus being used to plot ECG data on an associated strip chart recorder. The digital-to-analog converter represented by block 34 reconstructs the analog ECG signal which is then applied to a deflection driver represented by block 35 in FIG. 3. Block 35 is otherwise identified in FIG. 3 by the caption Deflection Driver. The output of the deflection driver controls a galvanometer movement, for example, which deflects a thermal stylus 36 in a well-known manner.

Using another output from block 32, digital data which represents the magnitude of the rate of change of the ECG analog signals is applied to block 37 which represents a Programmable Gain Amplifier and is further identified by that caption in FIG. 3. The digital data applied to block 37 is obtained under program control using a rate of change program on the digital data obtained from block 30. A simple "first difference" is an adequate approximation for the first derivative. This involves subtracting one data point from the next to obtain the differences. The high order four bits of this (without sign) may be used to drive a 16 level programmable gain amplifier (PGA). To simulate the overshoot effect of the analog approach, a signed second difference can be added to the unsigned first difference before the digital values are applied to block 37. The techniques just briefly described are well known to programmers skilled in the programming of digital computers so no further elaboration of these techniques is warranted. Programmable gain amplifiers made from a pair of Harris semiconductor HA-2400 four channel programmable amplifiers may be utilized in the practice of the present invention. FIGS. 8–25, page 435, in "IC OP-AMP COOKBOOK" by Walter G. Jung, published by Howard W. Sams & Co., Inc., 1974, shows such a programmable gain amplifier. Two HA-2400 amplifiers may be interconnected to provide 16 levels of control approximating the behavior of element 4 of FIG. 1. This "square law" behavior may be obtained by judicious choice of values for resistors R1 through R8 in a manner well known to those skilled in the art.

The output from the Programmable Gain Amplifier represented by block 37 can be adjusted using a voltage divider 38 and otherwise identified in FIG. 3 by the caption Manual Setting. In FIG. 3, the output from block 37 is applied to a Thermal Heat Driver (not shown) similar to the thermal heat driver represented by block 5 of FIG. 1. In a manner similar to that discussed in connection with FIG. 1, such a driver heats a thermal stylus in a manner similar to that discussed in connection with the heating of thermal stylus 6 of FIG. 1. In any instance where the rise and fall times of an analog signal are of the same order of magnitude as the thermal time constant, a constant density trace can be obtained using the approach of the present application.

Thus, for a stylus having a 200 ms nominal thermal time constant, the time delay introduced to achieve a constant density trace may be as little as 50 ms or as great as 200 ms depending on factors like applied power, ambient temperature, paper characteristics, air flow and heat transfer. To the extent that all the elements of FIG. 3 are commercially available, no further discussion of them is believed to be warranted.

Having thus described my invention, what I claim as new, and desire to secure by Letters Patent is:

1. Apparatus for providing a constant density trace of an analog signal the minimum rise and fall times of which are of the same order of magnitude as the thermal time constant of an associated thermal stylus comprising:

a record member having a thermally sensitive recording surface, a thermal stylus having a given thermal time constant disposed adjacent said record member, means connected to said thermal stylus for deflecting said stylus in response to said analog signal, means connected to said thermal stylus for applying power to said thermal stylus which is a function of the magnitude of the rate of change of amplitude of said analog signal, and means for introducing a delay of at most said given thermal time constant connected to said means for deflecting said stylus.

2. Apparatus according to claim 1 wherein said means for introducing a delay of at most said given thermal time constant includes means for introducing a delay in the range of 0.1 to 1.0 times said given time constant.

3. Apparatus according to claim 1 wherein said means for introducing a delay of at most said given time constant includes means for introducing a delay which is less than said given time constant.

4. Apparatus according to claim 1 wherein said means for introducing a delay of at most said given time constant includes means for introducing a delay which is equal to said given time constant.

5. Apparatus according to claim 1 wherein said means for applying power to said thermal stylus includes means for generating an electrical output representative of the rate of change of amplitude with respect to time of said analog signal, means connected to said means for generating an electrical output for generating a signal representative of the absolute magnitude of said electrical output, an amplifier, and driver means connected to said amplifier and said thermal stylus.

6. Apparatus according to claim 1 wherein said means for introducing a delay includes analog delay means.

7. Apparatus according to claim 1 wherein said means connected to said thermal stylus for applying power to said thermal stylus includes a programmable gain amplifier the input of which is a stream of digital data representative of the magnitude of the rate of change of said analog signal the output of which is an analog signal representative of the magnitude of the rate of change of said analog signal.

8. Apparatus according to claim 5 wherein said means for generating an electrical output is a differentiating circuit.

9. Apparatus according to claim 5 wherein said means for generating a signal representative of the absolute magnitude of said electrical output is a full wave rectifier.

* * * * *